(12) United States Patent
Bathiche et al.

(10) Patent No.: US 7,576,725 B2
(45) Date of Patent: Aug. 18, 2009

(54) USING CLEAR-CODED, SEE-THROUGH OBJECTS TO MANIPULATE VIRTUAL OBJECTS

(75) Inventors: Steven N. Bathiche, Kirkland, WA (US);
David J. Kurlander, Seattle, WA (US);
Joel P. Dehlin, Redmond, WA (US);
Dawson Yee, Clyde Hill, WA (US);
Donald Marcus Gillett, Bellevue, WA (US); Christina S. Chen, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 790 days.

(21) Appl. No.: 10/969,746

(22) Filed: Oct. 19, 2004

(65) Prior Publication Data

US 2006/0092170 A1   May 4, 2006

(51) Int. Cl.
*G09G 5/00* (2006.01)
(52) U.S. Cl. ..................... 345/156; 345/175
(58) Field of Classification Search ......... 345/156–176; 178/18.01, 18.02, 19.01, 19.02; 463/25; 348/169
See application file for complete search history.

(56) References Cited

U.S. PATENT DOCUMENTS

| | | | |
|---|---|---|---|
| 4,992,650 A | 2/1991 | Somerville | ............ 235/462 |
| 5,319,214 A | 6/1994 | Gregory | |
| 5,436,639 A | 7/1995 | Arai | |
| 5,483,261 A | 1/1996 | Yasutake | |
| 5,821,930 A | 10/1998 | Hansen | |
| 5,831,601 A | 11/1998 | Vogeley | |
| 5,835,692 A | 11/1998 | Cragun | |
| 5,900,863 A | 5/1999 | Numazaki | |

(Continued)

FOREIGN PATENT DOCUMENTS

EP     0690407     1/1996

(Continued)

OTHER PUBLICATIONS

Patten, James; Recht, Ben; Ishii, Hiroshi; "Audiopad: A Tag-based Interface for Musical Performance" NIME02—New Interface For Musical Express, May 26, 2002—May 26, 2002, Dublin, Ireland.

(Continued)

*Primary Examiner*—Nitin Patel
(74) *Attorney, Agent, or Firm*—Workman Nydegger

(57) ABSTRACT

An object placed on an interactive display surface is detected and its position and orientation are determined in response to IR light that is reflected from an encoded marking on the object. Upon detecting the object on an interactive display surface, a software program produces a virtual entity or image visible through the object to perform a predefined function. For example, the object may appear to magnify text visible through the object, or to translate a word or phrase from one language to another, so that the translated word or phrase is visible through the object. When the object is moved, the virtual entity or image that is visible through the object may move with it, or can control the function being performed. A plurality of such objects can each display a portion of an image, and when correctly positioned, together will display the entire image, like a jigsaw puzzle.

58 Claims, 12 Drawing Sheets

U.S. PATENT DOCUMENTS

| | | | |
|---|---|---|---|
| 5,920,688 | A | 7/1999 | Cooper |
| 5,940,076 | A | 8/1999 | Sommers |
| 5,973,315 | A | 10/1999 | Saldana |
| 6,128,003 | A | 10/2000 | Smith |
| 6,154,214 | A | 11/2000 | Uyehara |
| 6,266,061 | B1 | 7/2001 | Doi |
| 6,340,119 | B2 | 1/2002 | He |
| 6,414,672 | B2 | 7/2002 | Rekimoto |
| 6,448,987 | B1 | 9/2002 | Easty |
| 6,469,722 | B1 | 10/2002 | Kinoe |
| 6,522,395 | B1 | 2/2003 | Bamji |
| 6,529,183 | B1 | 3/2003 | MacLean |
| 6,545,663 | B1 * | 4/2003 | Arbter et al. ............. 345/158 |
| 6,614,422 | B1 | 9/2003 | Rafii |
| 6,654,007 | B2 | 11/2003 | Ito |
| 6,720,949 | B1 | 4/2004 | Pryor |
| 6,750,877 | B2 | 6/2004 | Rosenberg |
| 6,788,813 | B2 * | 9/2004 | Cooper .................. 382/167 |
| 6,791,530 | B2 | 9/2004 | Vernier |
| 6,812,907 | B1 | 11/2004 | Gennetten |
| 6,840,627 | B2 | 1/2005 | Oldbrich |
| 6,959,102 | B2 | 10/2005 | Peck |
| 7,075,687 | B2 | 7/2006 | Lippert |
| 7,084,859 | B1 | 8/2006 | Pryor |
| 7,120,280 | B2 | 10/2006 | Biswas |
| 7,161,578 | B1 | 1/2007 | Schneider |
| 7,268,774 | B2 | 9/2007 | Pittel |
| 7,310,085 | B2 | 12/2007 | Holloway |
| 2002/0006786 | A1 | 1/2002 | Mine |
| 2002/0020807 | A1 | 2/2002 | Nougaret et al. |
| 2002/0079143 | A1 | 6/2002 | Silverstein et al. |
| 2003/3016524 | | 8/2003 | King |
| 2004/0005920 | A1 * | 1/2004 | Soltys et al. ............. 463/25 |
| 2004/0090524 | A1 | 5/2004 | Belliveau |
| 2004/0196371 | A1 | 10/2004 | Kono |
| 2005/0050476 | A1 | 3/2005 | SanGiovanni |
| 2005/0226467 | A1 | 10/2005 | Hatano |
| 2005/0226505 | A1 | 10/2005 | Wilson |
| 2005/0245302 | A1 | 11/2005 | Bathiche |
| 2005/0277071 | A1 | 12/2005 | Yee |
| 2005/0281475 | A1 | 12/2005 | Wilson |
| 2006/0010400 | A1 | 1/2006 | Dehlin |
| 2006/0034492 | A1 | 2/2006 | Siegel |
| 2006/0056662 | A1 | 3/2006 | Thieme |
| 2006/0289760 | A1 | 12/2006 | Bathiche |
| 2007/0126717 | A1 * | 6/2007 | Cohen et al. ............. 345/179 |
| 2007/0157095 | A1 | 7/2007 | Bilow |
| 2007/0279494 | A1 * | 12/2007 | Aman et al. ............. 348/169 |

FOREIGN PATENT DOCUMENTS

| | | |
|---|---|---|
| FR | 27656077 | 5/1998 |
| WO | 98/19292 | 5/1998 |

OTHER PUBLICATIONS

"The Tracking Cube: A Three-Dimensional Input Device" IBM Technical Disclosure Bulletin, IBM Corp. New York, US, vol. 32, No. 3B; Aug. 1, 1989, pp. 91-95.

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.

"Bar Code 1, 2-Dimensional Bar Code Page." Available http://www.adams1.com/pub/russadam/stack.html. Printed Jan. 20, 2004. 14pp.

Ambiente article. "InteracTable®." Dated Jul. 7, 2000. Available http://www.darmstadt.gmd.de/ambiente/activities/interactable.html. Printed Nov. 21, 2003. 3pp.

Bier, Stone, Pier, Buston, and DeRose. "Toolglass and Magic Lenses: The See-Through Interface." *Proceedings of Siggraph '93* (Anahemim, August). *Computer Graphics Annual Conference Series*, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

Dietz and Leigh. "DiamondTouch: A Multi-User Touch Technology." *UIST '01* Orlando Fla. © ACM 2001 1-58113-438-x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rjg/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR'2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp, Date not found.

Magerkurth, Stenzel, and Prante. "STARS—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp, Date not found.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM, 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptural User Interfaces (PUI'97)*, 1997. 3pp.

Rekimoto and Nagao. "The World through the Computer: Computer Augmented Interactive with Real World Environments." *Proceedings of UIST'95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1990 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998, 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5 pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews*, TablePCHome.com—*Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar.+Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

SMART Technologies Inc. White Paper. "DViT Digital Vision Touch Technology." Feb. 2003. 10pp.

Smart Technologies, Inc. "Rear Projection SMART Board ™ Interactive Whiteboard" "SMART Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metaDESK: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. INTERACT 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"Virtualboard." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 25, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

Office Action dated Sep. 2, 2008 cited in U.S. Appl. No. 11/170,234 (Copy Attached).

Notice of Allowance dated Sep. 11, 2008 cited in U.S. Appl. No. 11/117,979 (Copy Attached).

Office Action dated Jul. 10, 2008 cited in U.S. Application No. 10/867,434 (Copy Attached).

Office Action dated Feb. 8, 2008 cited in U.S. Application No. 11/321,551 (Copy Attached).

Office Action dated Aug. 19, 2008 cited in U.S. Application No. 11/321,551 (Copy Attached).

Notice of Allowance dated Oct. 16, 2007 cited in U.S. Application No. 10/814,761 (Copy Attached).

Office Action dated Aug. 29, 2008 cited in U.S. Application No. 10/870,777 (Copy Attached).

U.S. Appl. no. 12/110,032, filed Apr. 25, 2008, Bathiche.

Koike, Sato, and Kobayashi. "Integrating Paper and Digital Information on EnhanceDesk: A Method for Reltime Finger Tracking on an Augmented Desk System." ACM Transaction on Computer-Human Interaction, vol. 8 No.4, Dec. 2001. ©2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments. " Proceedings of the IEEE Virtual Relaity 2000 Conference, Mar. 18-22, 2000. New Brunswich, New Jersey: IEEE Computer Society, 2000. 8pp.

Leigh and Dietz "DiamondTouch Characteristics and Capabilities." Mitsubishi Electric Research Laboratories, Cambridge, Massachusetts, USA. Undated . 2pp.

Magerkurth, Stenzel, and Prante. "STARS - A Ubiquitous Computing Platform fo rComputer Augmented Tabletop Games." 5th International Conference on Ubiquitous Computing (Ubicomp '03), Oct. 12-15, 2003, Seattle Washington. 2 pp.

Malandain, Gregoire. "Connected Components Extraction." Available http://www-sop.inria.fr/epidaure/personnel/malandai/segment/connese.html. Printed Dec. 18, 2003. 3pp.

Matsushita and Rekimoto. "HoloWall; Designing a Finger, Hand, Body, and Object Sensitive Wall." UIST '97 Banff, ALberta, Canada. © 1997 ACM 0-89791-881-9/97/10. pp. 209-210.

Missouri Department of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." UIST '99. Asheville, NC. © 1999 ACM 1-58113-075-99/99/11, CHI Letters vol. 1, 1. pp. 197-206.

Pangaro, Maynes-Aminzade, and Ishii. "The Actuated Workbench: Computer- Controlled Actuation in Tabletop Tangible Interfaces." Proceedings of UIST 2002, Oct. 27-30, 2002. © 2002 ACM. 10pp.

Paradiso, Hsiao, Strickon, Lifton, and Adler. "Sensor systems for interactive surfaces." IBM Systems Journal, vol. 39, No. 3.&4, 2000. pp. 892-914.

Patten, Ishii, Hines, and Pangaro. "Sensetable: A Wireless Object Tracking Platform for Tangible User Interfaces." Proceedings of CHI 2001, Mar. 31-Apr. 5, 2001, ACM Press ©ACM. 8 pp.

Ramos and Balakrishnan. "Fluid Interaction Techniques for the Control and Annotation of Digital Video." UIST '03 Vancouver, B.C., Canada. © 2003 ACM 1-58133-636-Jun. 03, 0010. pp. 105-114.

Rekimoto and Ayatsuka "CyberCode: Designing Augmented Reality Environments with Visual Tags." Proc. Of UIST 2000, 2000. 10pp.

Rekimoto and Matsushita. "Perceptual Surfaces :Towards a Human and Object Sensitive Interactive Display." Proceedings of Workshop on Perceptural User Interactes (PUI'97), 1997. 3pp.

Rekimoto and Nagao. "The World through the Computer: Computer Augmented Interaction with Real World Environments." Proceedings of UIST'95, 1995. pp. 29-36.

Rekimoto and Saitoh. "Augmented Surfaces: A Spatially Coninuous Work Space for Hybrid Computing Environments." CHI '99, May 15-20, 1999. Pittsburgh, Pennsylvania. © ACM 1999 0-201-48559-1/99/05. pp. 378-385.

Rekimoto, Jun. "Matrix: A Realtime Object Identification and Reistration Method for Augmented Reality."Proc. of Asia Pacific Computer Human Interaction (APCHI '98), 1998. 6pp.

Rekimoto, Jun. "Multiple-Computer User Interfaces: 'Beyond the Desktop' Direct Manipulation Environments." ACI CHI2000 Video Proceedings, 2000. 2pp.

Hardenberg Von. Christian, "Fingertracking and Handposture Recognition for Real-Tim Human-Computer Interaction", Berlin, Jul. 20, 2001.

Kijma, Ryugo, et al. "Distributed Display Approach Using PHMD with Infrared Camera", Proceedings of the IEEE Virtual Rality, Orlando, Florida, Mar. 24-28, 2002. pp. 1-8.

Pavlidis, Ioannis, et al. "A Vehicle Occupant Counting System Based on Near-Infrared Phenomenology and Fuzzy Neural Classification", IEEE Transactions on Intelligent Transportation Systtem, New York, NY, vol. 1, No. 2, Jun. 2000, pp. 78-80.

Northop Grumman "TouchTable™" Brochure ©2005 Northop Grumman Space & Mission Systems Corp. RS1190705. 2pp.

Department of Defence, Department of Defence Logistics Automatic Identification Technology Handbook for Product and Shipping Label Quality Assurance, Feb. 15, 2000, p. 14, Section 3.3.3.6, http://www.dodait.com/conf/data1199/printquality/print0111r6.doc.

Office Action dated Jun. 29, 2007 cited in related U.S. Application No. 10/834,675 (Copy Attached).

Office Action dated Aug. 30, 20007 cited in related U.S. Application No. 10/870,777 (Copy Attached).

Office Action dated Dec. 13, 2007 cited in related U.S. Application No. 10/834,675 (Copy Attached).

Office Action dated Oct. 9, 2007 cited in related U.S. Application No. 10/867,434 (Copy Attached).

Notice of Allowance dated Feb. 28, 2008, cited in related U.S. Appl. No. 10/870,777 (Copy Attached).

Notice of Allowance dated Mar. 28, 2008 cited in related U.S. Appl. No. 10/834,675 Copy Attached).

Notice of Allowance mailed Feb. 27, 2008 cited in related U.S. Appl. No. 10/814,761.

Office Action dated Mar. 25, 2008 cited in related application 10/880,167 (Copy Attached).

Notice of Allowance dated Apr. 23, 2008 cited in related U.S. Application No. 10/969,746 (Copy Attached).

Office Action dated Jun. 12, 2008 cited in related U.S. Application No. 11/117,979 (Copy Attached).

Office Action dated Oct. 9, 2007 cited in related U.S. Application No. 10/813,855 (Copy Attached).

Office Action dated May 7, 2008 cited in related U.S. Application No. 10/813,855 (Copy Attached).

Strickson, Joshua and Paradiso, Joseph; "Tracking Hands Above Large Interactive Surfaces with Low-Cost Scanning Laser Rangefinder" ACM CHI. 98 Conference, Apr. 21-23, 1998, Los Angeles, CA.; pp. 1-2.

Lensch, Hendrick P.A.; Goesele, Michael; Jan Kautz; Hans-Peter Seidel; "A Framework for the Acquisition, processing, Transmission, and Interactive Display of High Quality 3D Models on the Web" Research Report, MaxPlanck-Institute, May 2001; Sections 5 and 8.

Notice of Allowance dated Oct. 8, 2008 cited in U.S. Application No. 10/880,167 (Copy Attached).

Office Action dated Oct. 7, 2008 cited in U.S. Application No. 11/218,171 (Copy Attached).

Office Action dated Oct. 30, 2008 cited in U.S. Application No. 12/106,910 (Copy Attached).

* cited by examiner

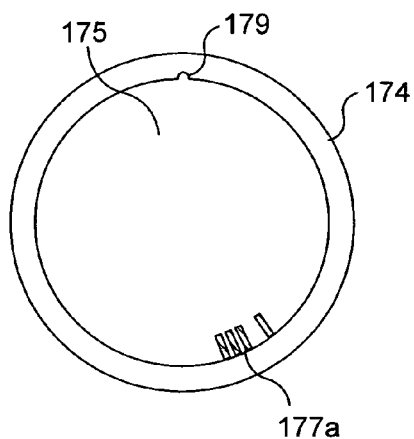
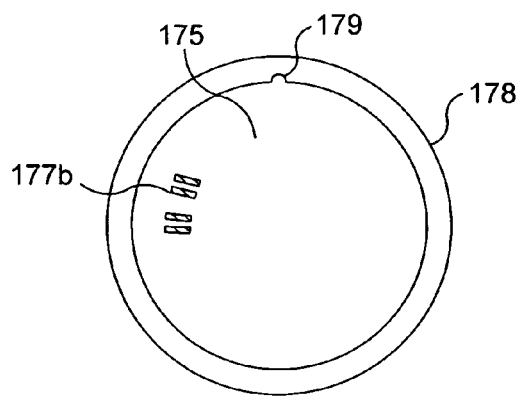
*FIG. 16A*   *FIG. 16B*
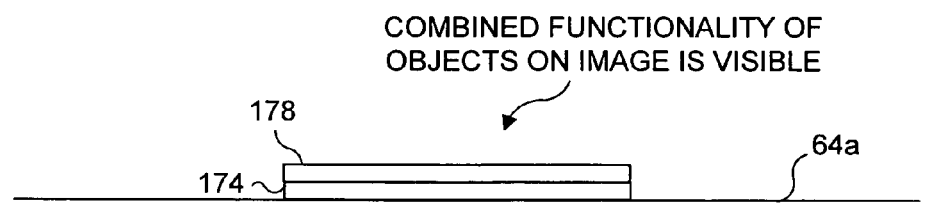
*FIG. 17*

USING CLEAR-CODED, SEE-THROUGH OBJECTS TO MANIPULATE VIRTUAL OBJECTS

FIELD OF THE INVENTION

This invention generally pertains to the use of a coded object for manipulating an virtual object or image, and more specifically, pertains to an object having a clear encoding that is generally transparent to visible light, so that a user can view virtual object or image through the object that appears on a surface on which the object is being manipulated.

BACKGROUND OF THE INVENTION

Virtual environments are typically employed in electronic games that are played on game consoles, personal computers, and other types of computing devices, as well as in other types of applications. A user usually interacts with entities in a virtual environment by manipulating a mouse, joystick, wheel, game pad, track ball, or other user input device that causes the virtual entity to move in a specific manner or carry out some other action or function as defined by the software program that produces the virtual environment. The effects of a user interaction with an entity in the virtual environment are generally visible on a display. For example, a user might be controlling a virtual entity such as a spaceship or race car that is displayed in the virtual environment. Thus, the interaction between a user and virtual entities in a virtual environment is well known.

Another form of user input employs displays that are responsive to the touch of a user's finger or a stylus. Touch responsive displays can be pressure activated, responsive to electrical capacitance, changes in magnetic field intensity, employ surface acoustic waves, or respond to other variables that indicate the location of a finger or stylus on the display. Another type of touch sensitive display includes a plurality of optical sensors spaced-apart around the periphery of the display screen so that the location of a finger or stylus touching the screen can be detected. Using one of these touch sensitive displays, a user can more directly control a virtual entity or image that is displayed. For example, the user may touch the displayed virtual entity to select it and then drag the entity to a new position on the touch-sensitive display, or touch a control and drag the control to change some parameter.

However, in most such touch-sensitive displays, the response is only to the touch of the finger or stylus at a point. There is another type of interaction with a virtual environment that might provide a much richer experience for the user. While virtual environments produced for example, by electronic game software programs often include virtual entities that are displayed on a screen, it would be desirable for the virtual environment to also respond to physical objects that are placed on the display surface. In most prior art touch-sensitive displays, the finger or stylus is treated simply an alternative type of pointing device used to make selections or drag elements about on the screen. To be truly interactive to physical objects that are placed on it, a display surface should also be able to detect where one or more physical objects are placed on it, as well as detect different types of physical objects, each of which might provide a different interactive experience for the user. However, the capacitive, electromagnetic, optical, or other types of sensors used in conventional touch-sensitive displays typically cannot simultaneously detect the location of more than one finger or object touching the display screen at a time, and thus, would be unable to detect the location or each different type of a plurality of different types of physical objects placed thereon. These prior art touch-sensing systems are generally incapable of detecting more than a point of contact and are unable to detect the shape of an object proximate to or touching the display surface. Even capacitive or resistive, or acoustic surface wave sensing display surfaces that can detect multiple points of contact are unable to image objects placed on a display surface to any reasonable degree of resolution (detail), and most require expensive or relatively complicated coding schemes, than a more desirable simple bar code. Prior art systems of these types cannot detect patterns on an object or detailed shapes that might be used to identify each object among a plurality of different objects that are placed on a display surface.

Another user interface approach that has been developed in the prior art uses cameras mounted to the side and above a horizontal display screen to visually capture an image of a user's finger or other objects that are touching the display screen. This multiple camera mounting configuration is clearly not a compact system that most people would want to use in a residential setting. In addition, the accuracy of this type of multi-camera system in responding to an object that is on or proximate to the display surface depends upon the capability of the software used with the system to visually recognize objects and their location in three-dimensional space. Furthermore, the view of one object by one of the cameras may be blocked by an intervening object. Also it is difficult to deduce if a finger or object has touched the screen, and such a vision sensing system often requires an involved calibration. From an aesthetic viewpoint, objects usable in such a system will not be pleasing to a user because they will need a code that is most likely visible to the user on top of the object, and thus, the manner in which the object is being detected will be clearly evident to the user.

To address many of the problems inherent in the types of touch-sensitive displays discussed above, a user interface platform was developed in the MIT Media Lab, as reported by Brygg Ullmer and Hiroshi Ishii in "The metaDESK: Models and Prototypes for Tangible User Interfaces," *Proceedings of UIST* 10/1997:14-17. The metaDESK includes a near-horizontal graphical surface used to display two-dimensional geographical information. Above the graphical surface is disposed an arm-mounted flat-panel display that serves as an "active lens" for use in displaying three dimensional geographical information. A computer vision system inside the desk unit (i.e., below the graphical surface) includes infrared (IR) lamps, an IR camera, a video camera, a video projector, and mirrors. The mirrors reflect the graphical image projected by the projector onto the underside of the graphical display surface. The IR camera can detect passive objects called "phicons" that are placed on the graphical surface. Magnetic-field position sensors and electrical-contact sensors are also included in the metaDESK. For example, in response to the IR camera detecting an IR marking applied to the bottom of a "Great Dome phicon," a map of the MIT campus is displayed on the graphical surface, with the actual location of the Great Dome in the map positioned where the Great Dome phicon is located. Moving the Great Dome phicon over the graphical surface manipulates the displayed map by rotating or translating the map in correspondence to the movement of the phicon by a user.

A similar approach to sensing objects on a display surface is disclosed in several papers published by Jun Rekimoto of Sony Computer Science Laboratory, Inc. in collaboration with others. These papers briefly describe a "HoloWall" and a "HoloTable," both of which use IR light to detect objects that are proximate to or in contact with a display surface on which a rear-projected image is visible. The rear-projection panel, which is vertical in the HoloWall and horizontal in the HoloTable, is semi-opaque and diffusive, so that objects become more clearly visible as they approach and then contact the panel. The objects thus detected can be a user's fingers or hands, or other objects.

It would be desirable to enable interaction within a virtual environment between physical objects that are placed on a display surface and virtual objects or images that are displayed. Ideally, the interaction should go well beyond the use of a physical object to simply select and move a virtual object on a touch-sensitive screen, as has been done in the prior art. The interaction between physical objects and virtual objects or images that are displayed might take different forms. For example, it would be desirable to be able to position a physical object on the display surface, have the software program executing the virtual environment recognize the physical object and its location, and then respond to the presence of the physical object when displaying virtual objects. Also, the virtual object or image should be visible through the object and either be displayed in response to the physical object being placed on the display surface or modified when viewed through the physical object as a result of the physical object being detected on the displays surface. Thus, if the user moves a physical object to change its position or orientation on the display surface, in response, the software program producing the virtual entity of image should respond by changing some function, parameter, or feature related to the virtual entity or image. Also, the marking applied to the physical object should be invisible to the user and generally not effect visible light that is transmitted through the object. It would also be desirable to provide different markings on opposed surfaces of a physical object that will be detected when a specific surface of the object is placed on the display surface, so that each side surface of the object can cause different functions to be achieved.

There are many potential applications of such a physical object when used for interacting with a software program. By enabling a user to employ such a physical object in a clearly intuitive manner, the enjoyment and functionality of software programs executing on an interactive surface can be greatly improved.

SUMMARY OF THE INVENTION

The present invention extends the usability of an interactive user display surface by enabling the user to employ objects that are readily recognized by the display surface in response to an encoded pattern to control a software program that is executing on the interactive display surface. The encoded pattern is not visible to a user and does not interfere with visible light that is transmitted through the object as an image or a portion of an image produced on the interactive display surface by the software program. By responding to the position and orientation of one or more of these objects, various different functions can be implemented by the software program, and the software program can modify the image that is visible through the one or more objects.

One aspect of the present invention is directed to a method for enabling an object that is generally optically transparent to visible light (i.e., to light that can be seen by a human) to be optically recognized in response to non-visible light received from the object, without substantially effecting visible light transmission through the object. The method includes the step of applying a first marking on a first surface of the object. The first marking comprises a material that substantially transmits visible light, but which affects light in a non-visible waveband by either reflecting the light in the non-visible waveband, or alternatively, by absorbing the light in the non-visible waveband. The light in the non-visible waveband is directed onto the first surface of the object where the first marking is applied, and an image of at least a portion of the object is detected, in response to light in the non-visible waveband that is received from the object; the image enables the object to be recognized.

In one embodiment, the method also includes the step of applying a second marking to a second surface of the object. Again, the second marking comprises substantially the same material as the first marking. If the material comprising the first marking and the second marking absorbs the light in the non-visible waveband, the first surface is separated from the second surface by a reflective material that substantially transmits visible light, but reflects light in the non-visible waveband. Conversely, if the material comprising the first marking and the second marking reflects the light in the non-visible waveband, the first surface is separated from the second surface by an absorptive material that substantially transmits visible light, but absorbs light in the non-visible waveband.

The method provides for determining a state of the object by detecting light in the non-visible waveband that is received from either the first marking or the second marking. The first marking and the second marking each indicate a different state of the object. The state of the object that was determined is then used to control a software application that produces visible light, which passes through the object.

Any change in an orientation of the object over time is determined based upon the image produced with the light in the non-visible waveband that was received from either the first surface or the second surface. As a function of the change in the orientation of the object over time, the software application that produces visible light passing through the object is controlled. The change in the orientation of the object based upon the non-visible light from the first marking causes a different control function to be applied to the software application than the change in the orientation of the object based upon the non-visible light from the second marking.

Preferably, the first marking is applied as an encoded pattern that is automatically recognized in the image of at least the portion of the object when the light in the non-visible waveband is received from the first surface. Similarly, in the embodiment where the second marking is applied as an encoded pattern, that pattern is also automatically recognized in the image of at least the portion of the object when the light in the non-visible waveband is received from the second surface.

The method preferably includes the step of determining an orientation of the object based upon the light in the non-visible waveband that is received from the first surface, and detecting a change in the orientation of the object over time. This change in orientation is used for providing an input to control the software application that produces visible light passing through the object. For example, in one application, the change in the orientation of the object over time is employed to change a magnification factor affecting an image formed by the software application with the visible light, so that the image is either enlarged or decreased in relative size, as the orientation of the object is changed, depending upon a direction in which the orientation of the object is changed.

In another application of the invention, the method includes the step of changing an orientation of the image formed by the visible light that passes through the object and which is produced by the software application, in a manner corresponding with the change in the orientation of the object over time, so that the image formed with the visible light appears to move with the object when the orientation of the object is changed. Similarly, the method can also include the step of changing a position of the image formed by the visible light that passes through the object and which is produced by the software application, in a manner corresponding with a change in the position of the object. In this case, the image formed with the visible light appears to move with the object when a position of the object is changed.

Clearly, this invention is applicable to a plurality of objects, so that in one embodiment, the method also includes the step of repeating each of the steps noted above, for each of the plurality of other objects. In this case, the image formed with the visible light that passes through the object by the software application can comprise a portion of a larger image that is divided into a plurality of portions. In one application to which this step is applies, the method then further includes the step of projecting each of a plurality of portions of the larger image through a corresponding other object so that the portions of the image appear as pieces of a jigsaw puzzle. If objects are then properly assembled adjacent to each other, they correctly present the larger image, just as the pieces of a jigsaw puzzle when assembled correctly, produce the picture of the puzzle. Optionally, if any of the objects are turned over so that the side previously facing up now faces down on the surface through which the portion of the image visible through the object is produced, the opposite side of each object can be detected. As a result, a mirror image version of the portion of the image is visible through the object. Since the side that causes the mirror image of the portion of the image to be displayed may be identical in appearance to the user, the inability to determine the side of each object that should be facing downwardly to correctly achieve the full image will make the challenge of assembling the objects to make the full image correctly visible much more difficult and entertaining.

Another option is to provide a video jigsaw puzzle with the present invention. The video jigsaw puzzle employs a video source to provide a sequence of images so that the portions of the images are changing as the images comprising the video change over time. Clearly, the video jigsaw puzzle presents a much more challenging problem to assemble the objects correctly to see the sequence of images, since the image is not static, and the portions of the image that are visible though each of the objects change dynamically making it more difficult to determine how objects that should be correctly assembled. It should also be noted that an image or video used with the jigsaw puzzle application of the present invention can be a person photo or image created by the user, or can be video that the user has produced.

In another application of the invention, the software program causes visible light passing through the object to form text corresponding to a translation of at least one word into a different language than the at least one word over which the object is positioned. This application can be useful in learning a foreign language by enabling a user to selectively use the object to display the translation of a word or phrase.

There are many other applications to which the present invention is applicable. For example, the method can include the steps of displaying a first image with visible light produced in accord with a software program, and enabling the object to be placed over the first image. Visible light transmitted through the object then forms a second image that is related to the first image, but is different than the first image. Thus, if the first image comprises a photograph, the second image can represent the photograph after a modification has been applied. Further, the method can then include the step of enabling a user to change an orientation of the object to adjust the modification applied to the photograph that is visible through the object as the second image.

In a related application, the first image represents an entity having a first appearance, and the second image represents the entity having a different appearance. Using the object, some feature of the entity in the first image is thus modified as the entity appears in the second image. Various uses of this application might relate to viewing a person with different hairstyles or with different styles of articles of clothing, or using the object for modifying the appearance of a photograph image, e.g., to change the hue, color, saturation, etc. The method preferably enables a user to move the object to control the modification of the feature.

Other aspects of the present invention are directed to a memory medium having machine executable instructions for generally carrying out the steps of method discussed above, as well as to a system on which an object that is generally optically transparent to visible light is optically recognized in response to non-visible light received from the object, without substantially effecting visible light transmission through the object. The system includes a source of non-visible light for illuminating an object, an image source that produces an image using visible light, a sensor for producing a signal in response to non-visible light that is received from the object, and a memory in which machine instructions are stored. Also included is a processor that is coupled to the image source, the sensor, and the memory. The processor executes the machine instructions to carry out a plurality of functions, which are generally also consistent with the steps of the method discussed above.

Yet other aspects of the present invention are directed to a method, a system, and a memory medium method for employing objects that are generally optically transparent to visible light through which portions of an image are transmitted using visible light, so that as the objects are moved about, the portions of the image move with the objects, which is like the application of the invention that replicates much of the functionality of a jigsaw puzzle, but with the objects as defined above being used to convey the portions of the image that must be correctly arranged to display the entire image.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 14:
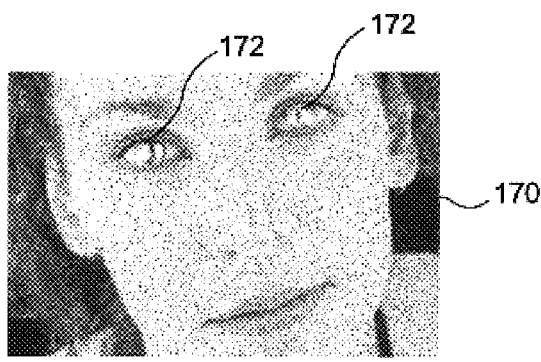
Figure 15:
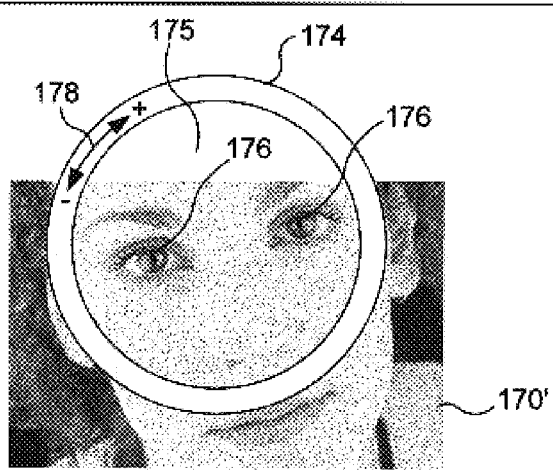
Figure 18:
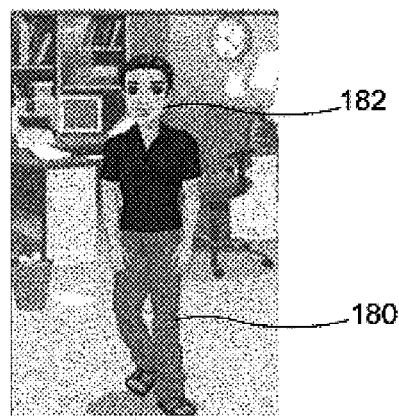
Figure 19:
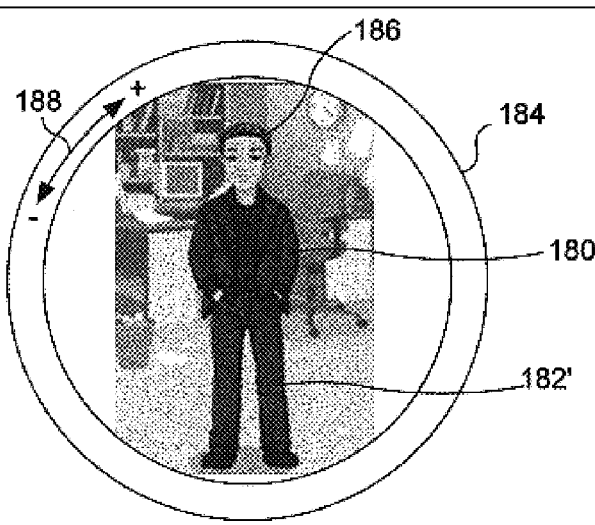
Figure 20:
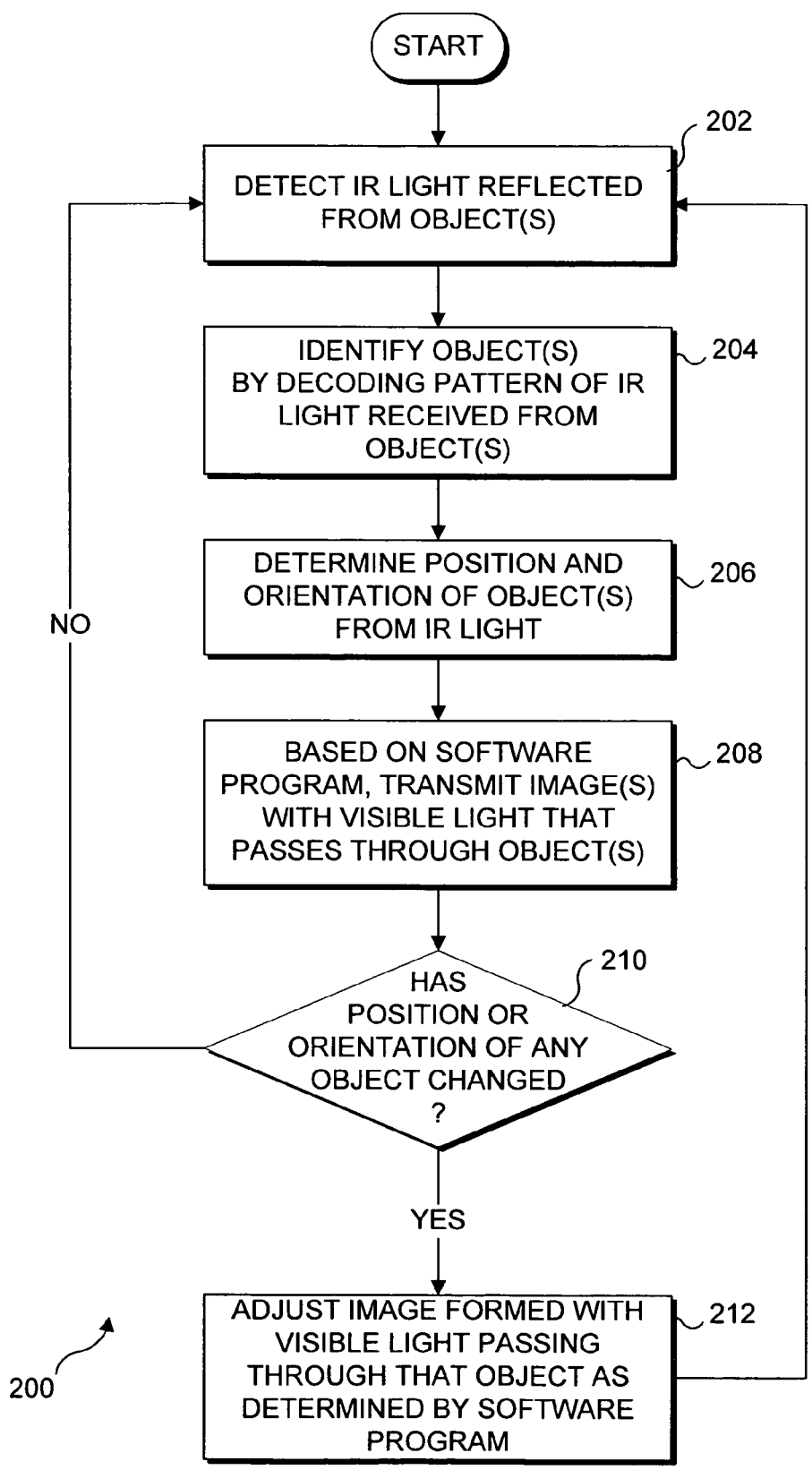

FIGS. 14 and 15 illustrate yet another application of the present invention, in which a photographic image of a woman taken with a flash so that the eyes of the woman exhibit "red eye," as shown in FIG. 14, is automatically corrected when viewed through an object configured in accord with the present invention, as shown in FIG. 15, and serves to illustrate that other such changes to a photograph can be made by rotating the object;

FIGS. 16A and 16B respectively show the bottom surface of two objects configured in accord with the present invention, each object being associated with performing a different function in modifying an image;

FIG. 17 illustrates a side-elevational view of the two objects of FIGS. 16A and 16B, stacked one atop the other, so that the combined functionality of the objects is visible in the image seen in the central portion of the two objects;

FIGS. 18 and 19 illustrate how other types of changes can be made to a virtual entity or image, such as a virtual entity representing a person, as shown on the interactive display surface in FIG. 18, when the virtual entity is viewed through an object configured in accord with the present invention, as shown in FIG. 19; and FIG. 20 is a flow chart indicating the logical steps that are carried out in implementing the functions provided using the object in connection with providing input to a software program.

DESCRIPTION OF THE PREFERRED EMBODIMENT

Exemplary Computing System for Implementing Present Invention

Figure 1:
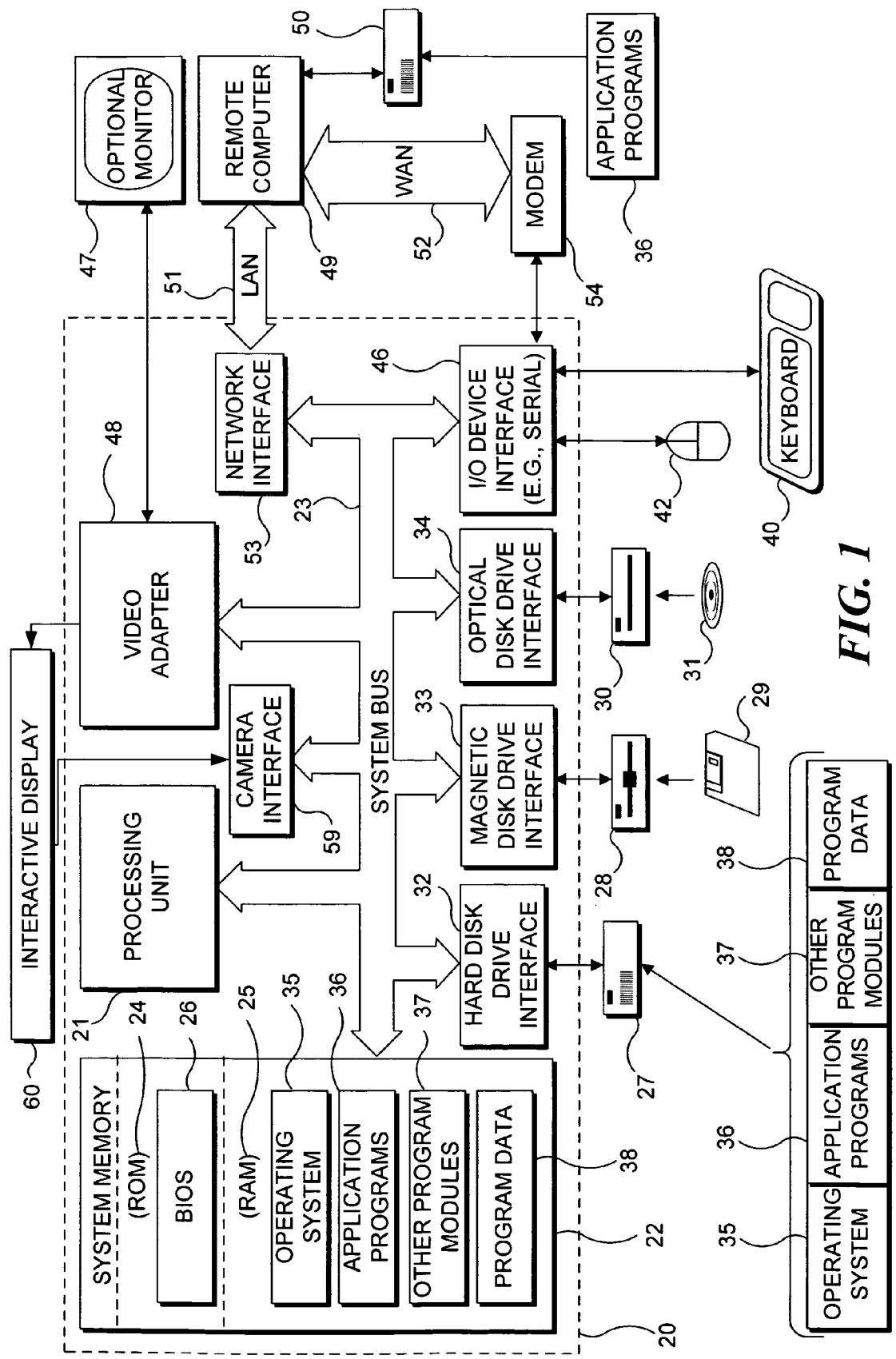
FIG. 1 is a functional block diagram of a generally conventional personal computer (PC) that is suitable for processing the input and output data used in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals from a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced using a single computing device, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, e.g., over the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary, and other means of establishing a communications link between the computers may be used, such as wireless communication and wide band network links.

Exemplary Interactive Surface

Figure 2:
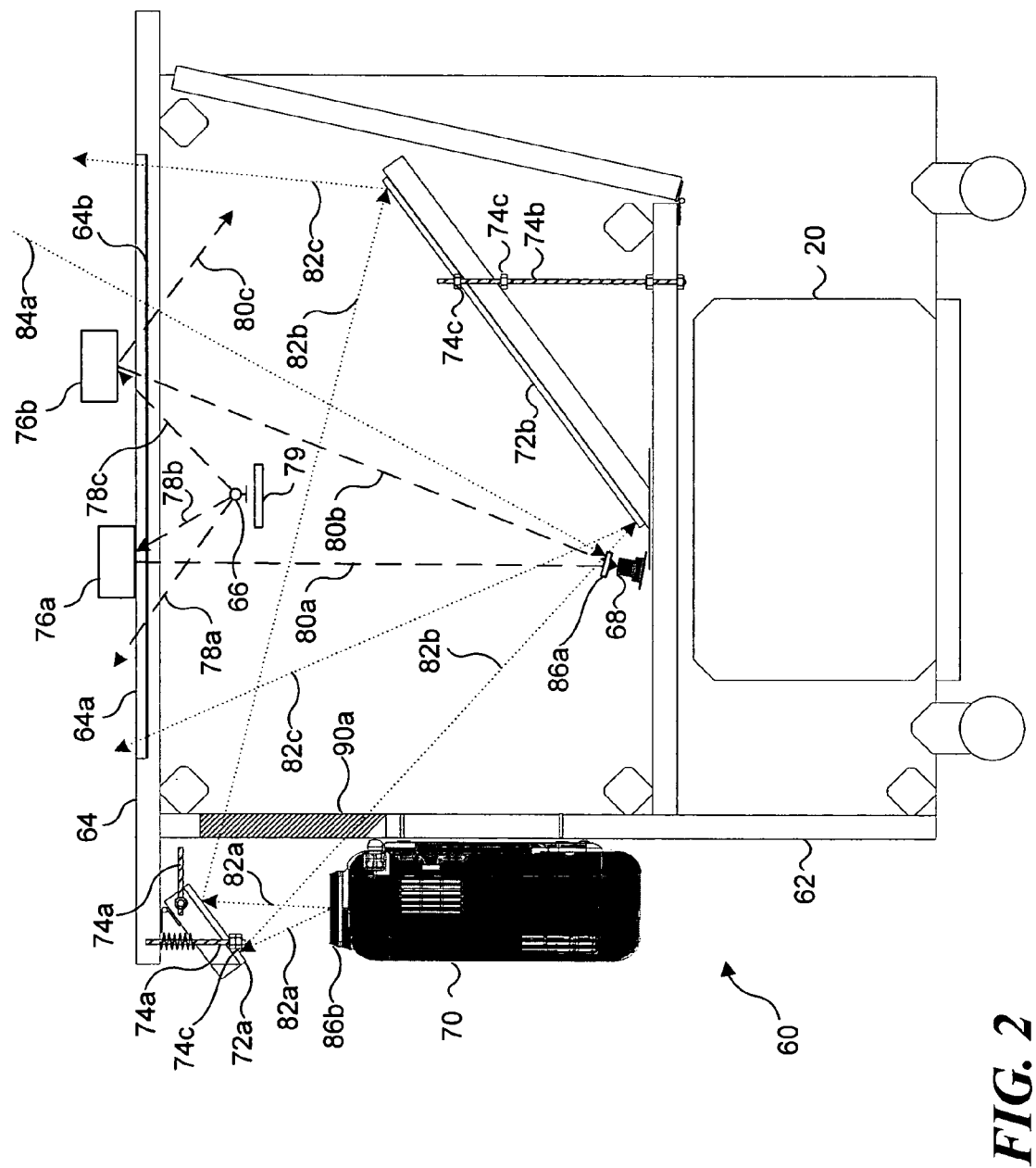
FIG. 2 is an illustration of the interior of the interactive table showing hardware components of the interactive table, the paths followed by light within the interactive table, and exemplary objects disposed on and above the surface of the table.

In FIG. 2, an exemplary interactive display 60 is shown that includes PC 20 within a frame 62 and which serves as both an optical input and video display device for the computer. In this cut-away Figure of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. The logical steps implemented to carry out this function are explained below.

Figure 3:
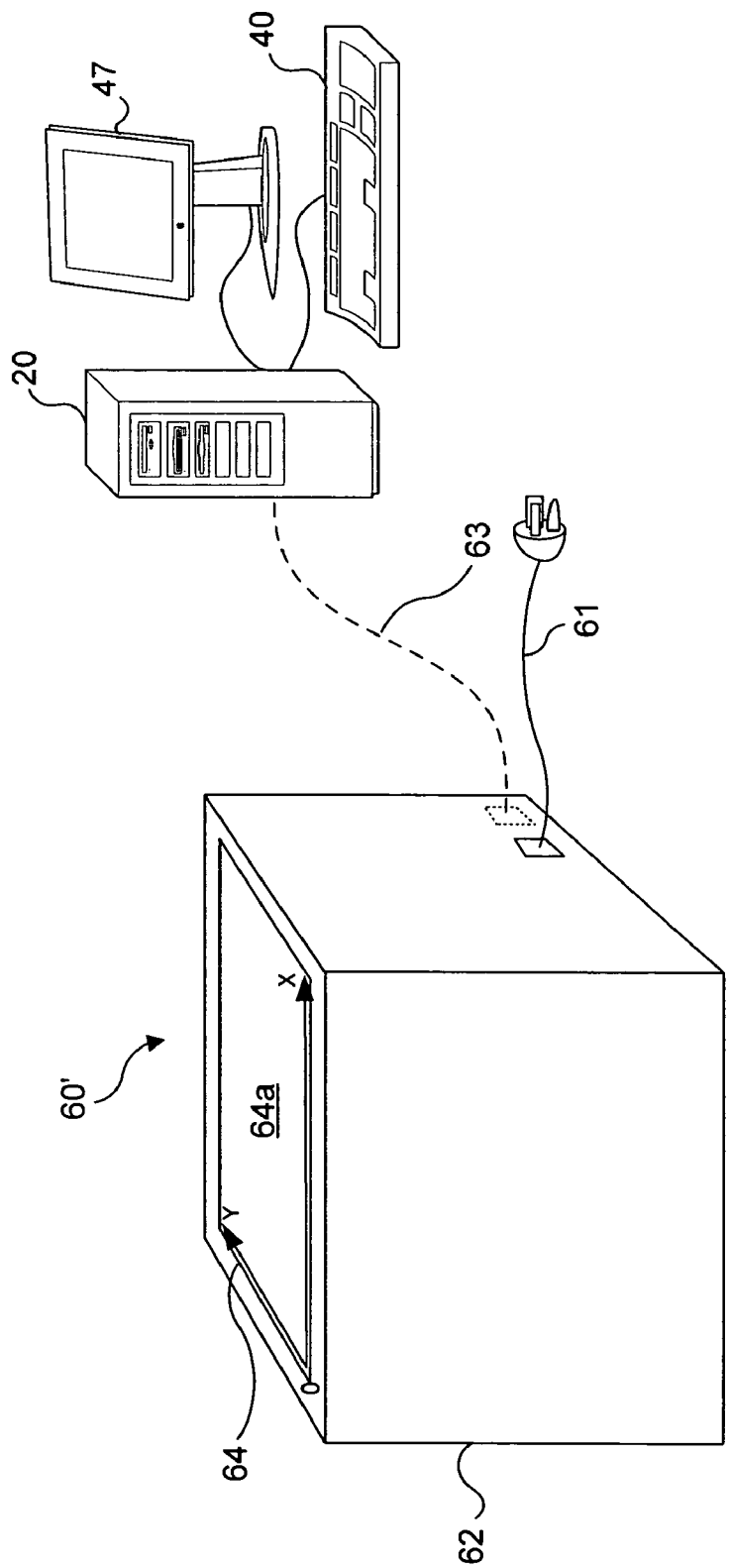
FIG. 3 is an isometric view of an interactive display table coupled to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "0." While not specifically shown, it will be appreciated that a plurality of coordinate locations along each orthogonal axis can be employed to indicate any location on display surface 64a.

If the interactive display table is connected to an external PC 20 (as in FIG. 3) or to some other type of external computing device, such as a set top box, video game, laptop computer, or media computer (none shown), then the interactive display table comprises an input/output device. Power for the interactive display table is provided through a power lead 61, which is coupled to a conventional alternating current (AC) line source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table (i.e., of either embodiments discussed above) is its ability to display graphic images or a virtual environment for games or other software applications and to enable an interaction between the graphic image or virtual environment visible on display surface 64a and objects that are resting atop the display surface, such as a touch object 76a, or are hovering just above it, such as a hover object 76b. It is the ability of the interactive display table to visually detect such objects, as well as the user's finger or other object being moved by the user that greatly facilities this rich interaction.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, or a liquid crystal on silicon (LCOS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light along a path 82b onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b, and more importantly, helps in achieving a desired size and shape of the interactive display table, so that the interactive display table is not too large and is sized and shaped so as to enable the user to sit comfortably next to it.

Physical Objects Usable to Control Software Applications

Figure 4:
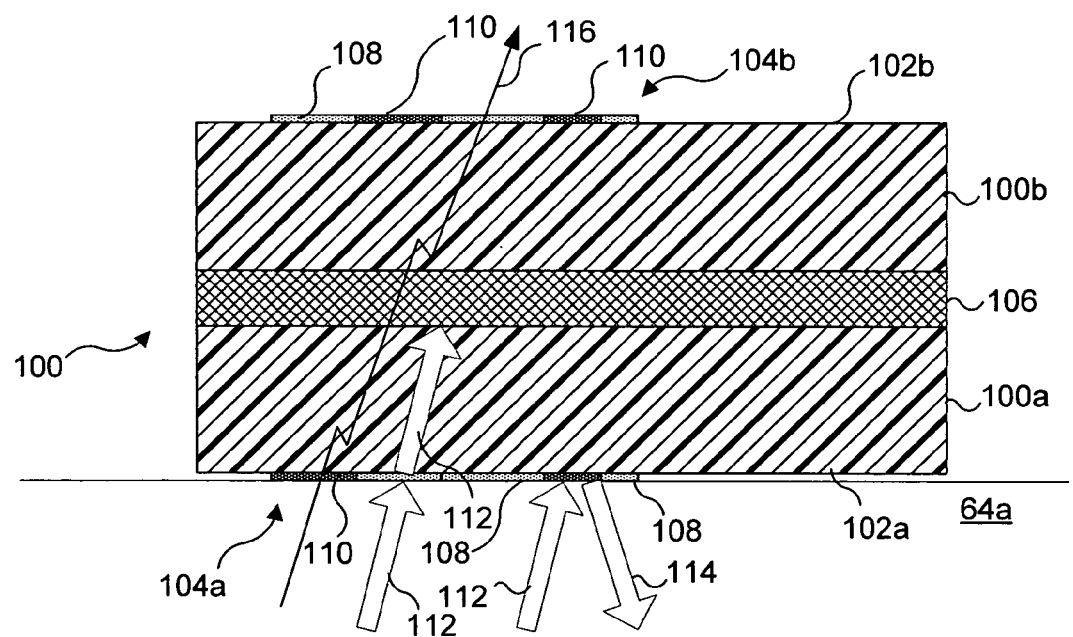
FIG. 4 is an elevational cross-sectional view of an object with an visible light transmissive encoded marking applied on opposite sides, in accord with the present invention.

Referring now to FIG. 4, an exemplary object 100 is illustrated having two opposed surfaces, including a first surface 102a (on the bottom of the object), and a second surface 102b (on the top of the object). The object is fabricated of a material that is substantially optically transparent to visible light (i.e., to light visible by a human). While the shape of object 100 is not in anyway intended to be limiting in regard to the scope of the present invention, in this example, object 100 appears as a generally square-shaped block that is relatively thin, i.e., in the dimension measured between first surface 102a and second surface 102b compared to any other dimension of the object.

A first encoded marking 104a is applied to first surface 102a, while a second encoded marking 104b is applied to second surface 102b, which is different than the first encoded marking. It will be appreciated that only a single encoded marking might alternatively be applied to either the first surface or the second surface of object 100, or that the same encoded marking might be applied to both the first surface and the second surface of the object. However, for purposes of illustration, the example shown in this Figure includes both the first encoded marking and the different second encoded marking, thereby enabling at least two different functions to be selectively activated, depending upon whether the first surface or the second surface is placed into contact with interactive display surface 64a. Thus, it will be apparent that IR light received from one of the encoded markings serves as an input to interactive display surface 64a, and that this input causes a predefined function that is associated with that encoded marking to be implemented, as explained in greater detail below.

In this exemplary embodiment of object 100, first and second encoded markings 104a and 104b comprise a material that readily transmits visible light, and which includes an IR reflective portion 110 and an IR transmissive portion 108. As an alternative, the encoded markings can include a portion that absorbs IR light, instead of IR reflective portion 110, as well as IR transmissive portion 108.

If, as shown in the embodiment illustrated in FIG. 4, first and second encoded markings are both used, then object 100 is preferably divided into a first layer 100a and a second layer 100b, which are separated by an intermediate layer 106. Furthermore, assuming that IR reflective portion 110 is used for each of the first and second encoded markings, then intermediate layer 106 will have the characteristics of absorbing IR light. Conversely, if instead of reflective portion 110, an IR absorptive portion is used, then intermediate layer 106 should reflect IR light. Intermediate layer 106 must also substantially transmit visible light 116, just as the first and second encoded markings do. Use of intermediate layer 106, in either case, ensures that only the encoded marking that is in contact with interactive surface 64a provides an encoded signal that is received by digital video camera 68 (FIG. 2) and that the other encoded marking disposed on the opposite surface of object 100 (i.e., on the surface of the object that is not in contact with the interactive display surface) does not interfere with determining the input to cause the correct function to be implemented in connection with interactive display surface 64a.

Figure 5:
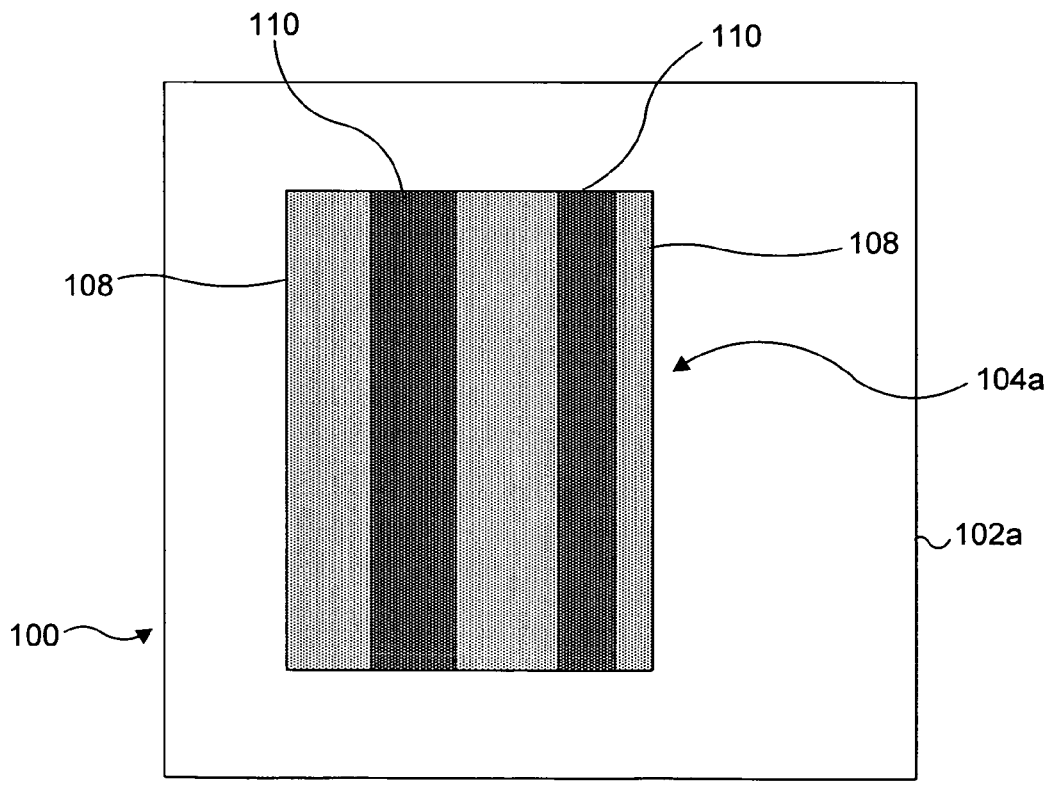
FIG. 5 is a bottom view of the object shown in FIG. 4, showing the encoded marking (which is preferably not visible to the human eye)

While many other encoded patterns might be used for the first and second encoded markings, as shown in the example illustrated in FIG. 5, first encoded marking 104a comprises a bar code comprising alternating bars or stripes of IR transmissive portion 108 and IR reflective portion 110 (or IR absorptive portion). The IR light reflected from the first or second encoded marking enables object 100 to be recognized by processing the signal produced by the digital video camera of the display table, in response to the IR light that is received from object 100. In addition, the position and orientation of object 100 on interactive display surface 64a is readily determined by the digital video camera. Furthermore, since both first and second markings and intermediate layer 106 (if used) readily transmit visible light 116, any virtual entity or image appearing on the portion of interactive display surface 64a immediately under object 100 is readily visible by viewing the visible light from the virtual entity or image that is transmitted through object 100. Since the first and second encoded markings are preferably not readily visible to the human eye, it will not be readily apparent to a user how object 100 is being identified by the interactive table and how its location/orientation on interactive display surface 64a is being determined. Thus, the functionality provided by the present invention has a greater mystique, since the manner in which it is achieved is unclear to an uninformed user.

Figure 6:
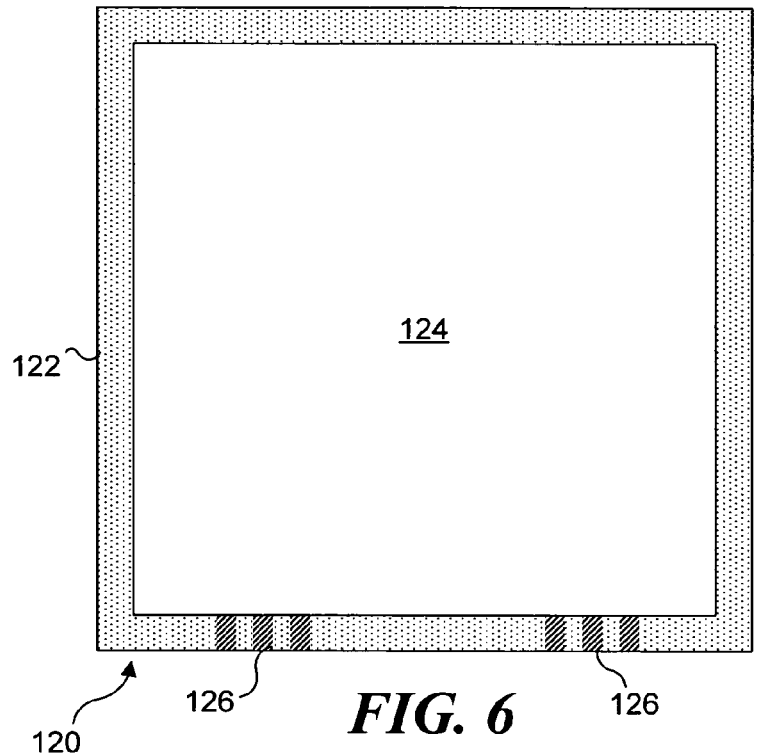
FIG. 6 illustrates a peripheral marking on a surface of an object in accord with the present invention that enables the central portion to be located on an interactive display surface, and which includes encoded markings that identify the object and indicate a reference side or edge.

FIG. 6 illustrates an object 120 having a peripheral IR reflective marking 122 on its surface around a central region 124. One side or edge of peripheral IR reflective marking 122 includes a plurality of IR transmissive bars 126 that both specifically identify object 120 and indicate its orientation, relative to the side or edge of the object along which IR transmissive bars 126 are disposed. Depending upon the particular encoding pattern used, the orientation of the object on which the encoded marking is applied may readily be determined by processing the signal produced by the digital video camera in response to the IR light reflected from this object. In addition, by providing the IR reflective periphery around central region 124, any virtual entity or image can readily be displayed on interactive display surface 64a immediately below object 120, so that the virtual entity or image is readily visible by viewing the visible light used to display the virtual entity or image that is transmitted through central region 124 of the object.

It is important to determine both the position and orientation of certain types of objects in connection with the present invention, so that the virtual entity or image that is visible through the object is sized and oriented correctly relative to the shape of the object and its location on the interactive display surface. The importance of this point will be more readily evident during the discussion that follows below, which describes several exemplary applications for this invention, when providing an input to initiate the predefined functionality implemented by different software programs executed by PC 20, which is included in or coupled externally to interactive table 60/60'.

Exemplary Applications of the Present Invention

Figure 7:
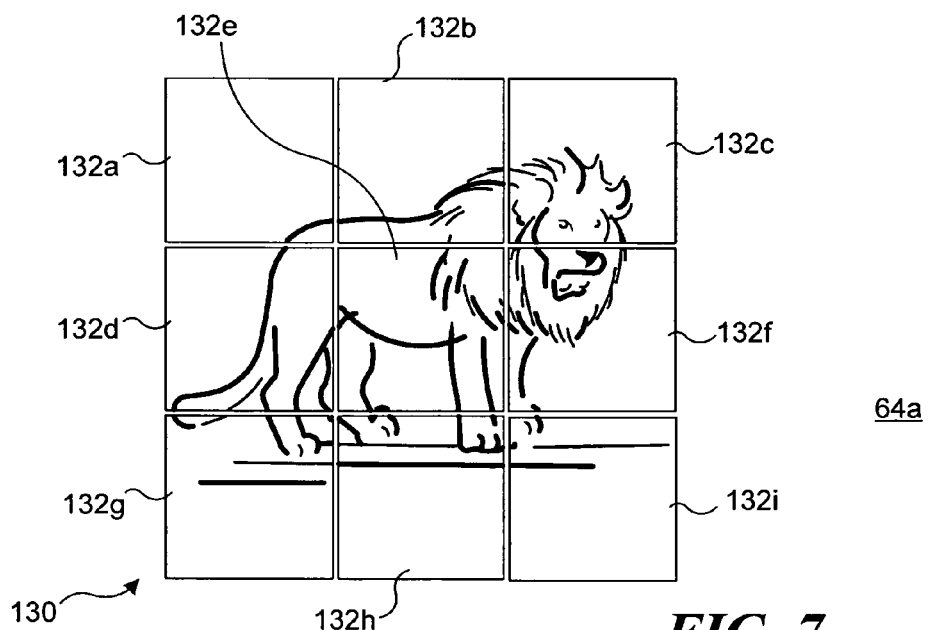
FIG. 7 illustrates an exemplary image comprising a plurality of portions of the image visible through objects configured in accord with the present invention, which have been correctly disposed on the interactive display surface, much like the pieces of a jigsaw puzzle are assembled, to display the image.
Figure 8:
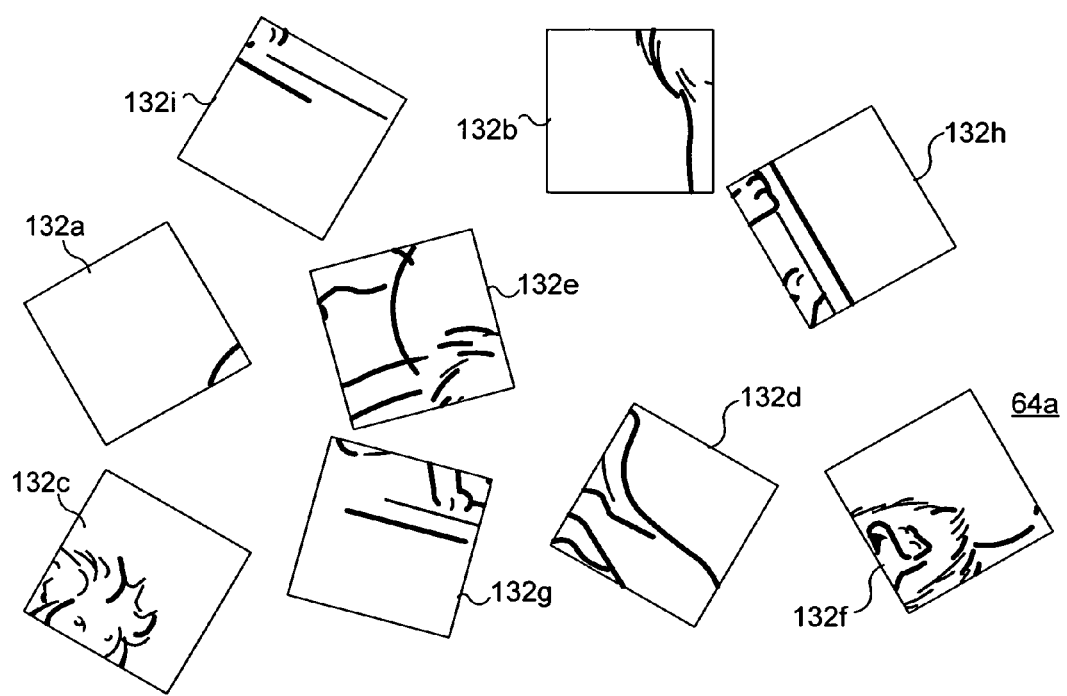
FIG. 8 illustrates a random distribution of the objects of FIG. 7 on the interactive display surface.

Perhaps one of the more interesting and entertaining applications of this invention, which very well illustrates its power when used on the interactive display surface, is shown in FIGS. 7 and 8. In FIG. 7, an image 130 displayed on interactive display surface 64a depicts a lion (in clip-art form). This image comprises a plurality of portions 132a-132i, each of which corresponds to a different object that is configured in accord with the present invention. To simplify this Figure, the same reference numerals 132a-132i also are used to identify the objects through which the portions of the image are visible. It should be understood that each of these objects is uniquely identified by an IR encoded marking (not shown in these Figures), so that the image of the corresponding portion is made to appear on interactive display surface 64a under that object with which the portion of the image is associated. The portion of the image displayed under the object is thus visible through the object. Thus, as illustrated in FIG. 8, when these objects are randomly distributed over interactive display surface 64a, corresponding portions of image 130 appearing on the interactive display surface are moved with each of the objects when randomly distributed. The portion of the image associated with each object thus appears to be a part of the object.

It should therefore be evident that the application shown in FIGS. 7 and 8 generally corresponds to a conventional jigsaw puzzle, wherein each object represents a different piece of the puzzle. Entertainment is provided for a user by enabling the user to reassemble these objects, so that their corresponding portions of the image together display image 130, as shown in FIG. 7. If the user were to pick up one of the objects, moving the object away from the interactive display surface, the portion of the image that was previously visible through the object would disappear from the interactive display surface. Since the unique encoded marking of that object would no longer be detected as resting on the interactive display surface, the portion of the image associated with that object would no longer be projected onto the interactive display surface.

Once the user has correctly assembled the objects and their corresponding image portions to again form image 130, the user can optionally cause a different new image to be displayed by the interactive display surface, so that the portions of this different new image are similarly associated with the objects. The user can randomly distribute the objects and then reassemble them correctly to form the new image. Alternatively, the objects can be randomly scattered by the user before the different new image portions are associated with each of the objects, making the task of correctly assembling the objects to achieve the different new image more difficult. Furthermore, it will be appreciated that either fewer or more objects can be employed when assigning portions of the image to the objects. Thus, for younger users, only a few objects may be used, since the image comprises only a corresponding few portions, while for older users, many more objects and a corresponding greater number of portions of the image might be used than are shown in this simple example, making the task of correctly reassembling the objects to form the image more difficult.

If objects associated with each portion of the image include different encoded markings on the opposite sides (as explained above in connection with FIG. 4), then it is possible to display a mirrored version of each portion of the image on any object that has been inverted, so that the other encoded marking is presented to the interactive display surface. It will be apparent that this twist adds a whole level of complexity and challenge to assembling the objects correctly, which is not provided by a conventional jigsaw puzzle, since it may not be evident to the user which side of each object corresponds to the mirror portion of the image, rather than to the normal portion of the image. Both sides of each object will appear identical to the user. If some of the objects are inverted relative to the other of the objects, it will not be possible to correctly assemble the objects to display the full image. The user must place all of the objects in the same state (i.e., all inverted or all non-inverted) to assemble respectively, either the mirror version of the full image, or the non-mirror version of the full image.

Another variation to this application of the present invention is to use a sequence of images provided with a video so that the portions of the image are not static, but change as the video advances to another image in the sequence. The rate of sequencing the images might be adjustable to be relatively slow, or might instead run at a "normal" rate of about 30 frames per second that is used with videos. The relative portions of the images that are sequenced associated with each object is maintained, so that once the objects are correctly assembled, the full images of the video will be clearly displayed through the objects. However, it will be appreciated that the use of a video instead of a static image for this application adds a further difficulty to the task of correctly assembling the objects and is unlike any conventional jigsaw puzzle.

It should also be noted that the static image or the video sequence of images can be provided by the user. For example, personal photos or other images of the user can be used for a static image, or a video produced by the user can be employed for that variation, as discussed above. Also, a sequence of photos (perhaps also provided by the user) can be used for the images that are sequenced, as discussed above. By employing the user's images or videos, the application can be customized to be more personally meaningful and be more entertaining to the user and friends.

Figure 9:
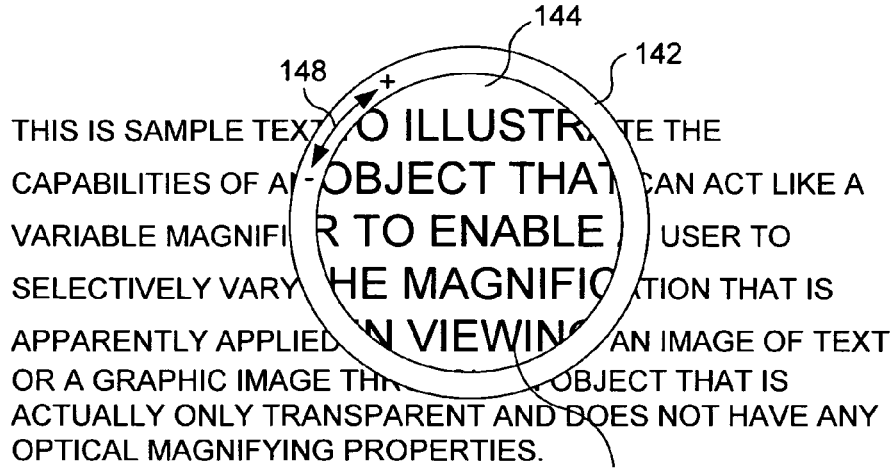
FIGS. 9 and 10 illustrate an exemplary application of the present invention in which an object configured in accord with the present invention respectively appears to function like a magnifier/reducer, to increase the size of text (FIG. 9), or to reduce the size of the text in response to a rotational orientation of the object (FIG. 10)
Figure 10:
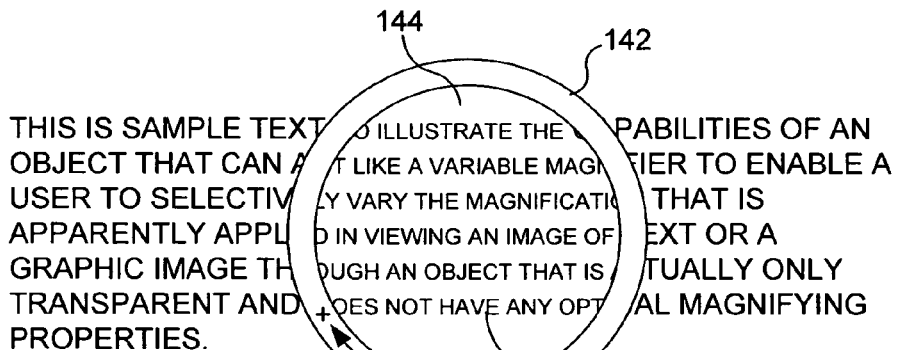

FIGS. 9 and 10 illustrate a different application of the present invention that can be used with almost any software application that displays text 140 on interactive display surface 64a. Text 140 is displayed at some nominal font size. However, when an object 142 that is annular-shaped (in regard to an outer periphery) with a clear center portion 144 is placed over text 140, the object changes the font size of the text visible through clear center portion 144, so that the text appears to be magnified, like text 146 in FIG. 9. As a user moves object 142 around over other parts of text 140, the part of the text that is visible within clear center portion 144 will be similarly magnified in size.

FIG. 10 illustrates the results of the user changing the orientation of object 122 by rotating it counterclockwise, relative to its disposition in FIG. 9. An arrow 148 indicates that if the user rotates object 142 in a clockwise direction, text 140 will be magnified, while if object 142 is rotated in a counterclockwise direction, text 146' will be visible within clear center portion 144 at a reduced size (i.e., using a smaller font than was applied in displaying text 140 outside clear center portion 144). Although not shown, it will be appreciated that object 142 can also be used to magnify or diminish the size of a photographic image or almost any other type of virtual entity that is visible within clear center portion 144, under the control of the user, simply by rotating object 142 in a desired direction to either magnify or diminish the size of the virtual entity or image.

Figure 11:
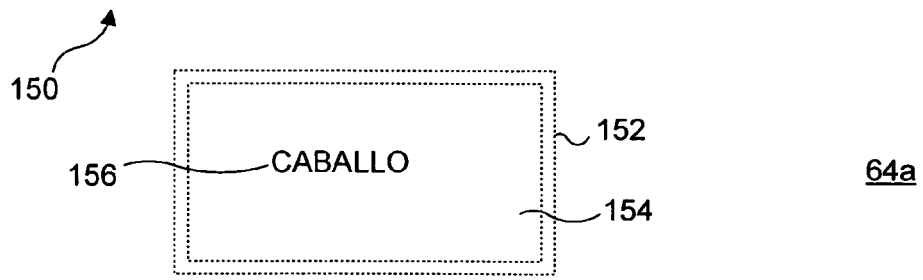
FIG. 11 illustrates an exemplary application, in which an object configured in accord with the present invention appears to produce a translation of a word or phrase that is visible on the interactive display surface, through the object.

An object 152, also in accord with the present invention, is illustrated in FIG. 11. In this exemplary application, object 152 appears to automatically display a translation of a word or phrase into a language different than that of the word or phrase that was visible before object 152 was moved over the word or phrase. Although translations between other selected languages can clearly be implemented with this invention, as indicated by text 150 in FIG. 11, the exemplary illustrated translation is of the word "horse," from English into the a corresponding Spanish word 156, i.e., "caballo." When object 152 is placed over the English word or phrase, the English word or phrase disappears (i.e., is no longer projected onto interactive display surface 64a, and the corresponding Spanish word or phrase is instead, so that it is visible through a clear center portion 154 of object 152. If making use of two different encoded markings that are provided on opposite surfaces of object 152, it would be possible to designate one surface facing up, for use in translating from English to Spanish, while the other surface facing up is designated for use of object 152 in translating from Spanish to English. Thus, object 152 might be used in an educational language program, enabling the user to intuitively check the translation of a word or phrase from one language to another during practice sessions. The software program providing the translation simply needs to respond to the object being place over the word or phrase in one language by displaying the translation of the word or phrase in the other language.

Figure 12:
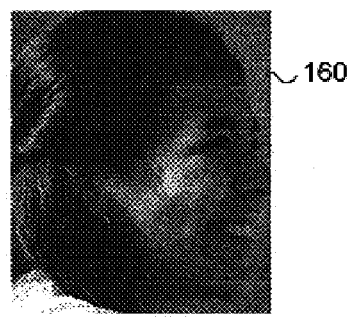
FIGS. 12 and 13 illustrate another application of the present invention, in which a portrait of a girl appearing on the interactive display surface in FIG. 12, when covered by an object configured in accord with the present invention, appears to cause an x-ray image of the girl's skull to be visible through the object, as shown in FIG. 13.
Figure 13:
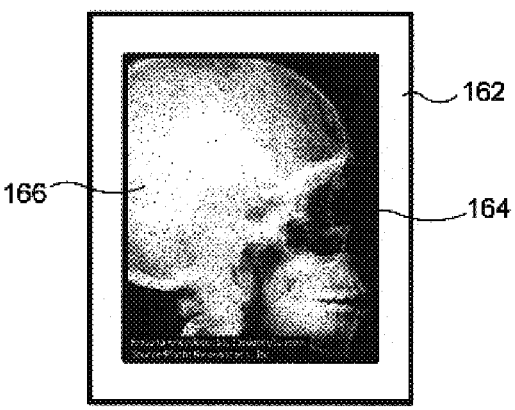

Still another application of this invention is illustrated in connection with FIGS. 12 and 13. In FIG. 12, a photographic image 160, i.e., a portrait of a girl, is displayed on interactive display surface 64a. In FIG. 13, an object 162 configured in accord with the present invention has been placed over photographic image 160, causing a software program that was displaying the photographic image to instead display an x-ray 164 corresponding to a skull 166 of the girl. (Note that skull 166 in this illustrative example is actually not the skull of the girl portrayed in a photographic image.) Accordingly, in response to detecting object 162 on interactive display surface 64a, a software program simply displays what appears to be an x-ray of the subject portrayed in the original image, whether an x-ray of a human, animal, or some virtual entity. Although not shown in these Figures, it will be appreciated that object 162 might also be manipulated by user, for example, by rotating it, to display other types of images corresponding to the original image previously displayed by the interactive display surface. For example, manipulation (e.g., rotation) of object 162 might cause the interactive display surface, operating under the control of a software program, to respond by displaying a magnetic resonance image (MRI) for the original subject, instead of x-ray 164. Object 162 might also be manipulated to change the depth within the original subject at which details or layers inside the subject are displayed. Thus, for example, by rotating object 162, a user might selectively view the skin, muscle structure, circulatory system, nervous system, skeleton, etc. of the original subject. Object 162 might also be used to explore any system, e.g., a circuit board, an integrated circuit chip, molecular structure, the human body, an insect, the universe (galaxy, solar system, planet, country, city, . . . ), a machine, and almost any other virtual entity that can be displayed, at a desired depth within the entity, where the depth or layer shown through the object is controlled by changing an orientation of the object or by affecting some other corresponding input. Those of ordinary skill in the art will appreciate that such functions can readily be implemented by an appropriate software program simply by detecting object 162 on interactive display surface 64a and responding to any change in orientation of the object or other input provided by the user to vary the level or layer or other aspects of the entity that is displayed on interactive display surface 64a and is visible through the object.

The present invention is also particularly applicable for modifying photographic images and immediately showing the result of the modification, which is visible through an object that is configured in accord with the present invention. For example, FIG. 14 illustrates a photographic image 170 of a woman taken with a flash (not shown), causing red eyes 172 to be evident in the image, which is a result of the reflection of the flash light from the retina of each of the woman's eyes. In FIG. 15, an object 174 having a central region 175 has been placed on interactive display surface 64a and centered over the eyes of the woman, causing a software program used for editing photographic images to automatically reduce or "fix" the red eye problem. Thus, eyes 176 now appear normal in an image 170', which is visible through the central region of object 174. The user thus has immediate visual feedback showing the effect of the red eye reduction. The user can select a different control (not shown) to save the image as thus modified.

It should be noted that object 174 is shown to have the annular shaped peripheral border that does not appear to be transparent to visible light. While, optionally, such a peripheral border (or other shape of peripheral border can be provided around the object, it should also be understood that a peripheral border that does transmit visible light can just as readily be used in the present invention. The border is shown in the example of FIG. 15 simply because it enables the adjustability of the object and its disposition on the underlying image to be more readily apparent. As discussed above, instead of optically detecting a peripheral border that does not transmit either visible or non-visible light to determine the extent of the object, the present invention can employ a peripheral border comprising a marking the either reflects non-visible light so that the extent of the object (i.e., its border) is clearly determinably by the video camera that responds to non-visible IR light received from the object.

It should also be apparent that object 174 can alternatively be employed to modify other characteristics of photographic image 170, assuming that the object is associated with modifying that characteristic. For example, if the user rotates object 174 as indicated by an arrow 178, photographic image 170 might be modified by adjusting the hue, saturation, or contrast of the photographic image (depending upon the function that is associated with object 174), and the user will again immediately see the results. The extent of the modification is controlled by the amount that the user rotates object 174, e.g., in a clockwise direction to increase the modification, and in a counterclockwise direction to decrease the modification. The user can also reposition object 174 after the modification has been adjusted, to view its effect on a different portion of photographic image 170 that is then visible through the central portion of object 174.

FIGS. 16A and 16B respectively illustrate object 174 and an object 178, each of which are provided with an indexing notch 179. Also evident in these two Figures are an encoded marking 177a on object 174, and a different encoded marking 177b on object 178. For the sake of discussion, both encoded marking 177a and different encoded marking 177b are visible in central region 175 of each object. The encoded markings are each associated with a different image modification function. For example, encoded marking 177a is associated with adjusting contrast/brightness of an image, while different encoded marking 177b is associated with adjusting the hue of an image. It will be understood further, that if each object is rotated about its center by the user, the extent and nature of the modification can readily be selectively adjusted, as discussed above.

In FIG. 17, object 178 has been stacked atop object 174. While not evident from the side-elevational view shown, the change in the contrast/brightness and the change in hue, on the image visible through central regions 175 of the objects, which is caused by rotating the objects, is readily perceptible. Since each of two or more such objects that are stacked to achieve the combined functionality of all of the objects must be separately identified, it is important that the encoded markings applied to the two objects be substantially separated and not overlap. The encoded markings on the objects can thus be both angularly and radially offset from each other. To enable stacking, it is also important that the encoded markings only be applied to one surface of the object and that no intermediate layer that absorbs the non-visible light be provided in the objects, since this intermediate layer would prevent the object(s) stacked atop the bottom object from being identified. To help keep track of the relative rotational adjustment of each object that is made by the user, notches 179 are provided on each object and can initially be aligned as the objects are placed on interactive display surface 64a or on another object in the stack. Each object can then be selectively individually rotated to achieve the desired adjustment to contrast/brightness provided by object 174, and the desired adjustment to hue provided object 178, in this example.

Almost any characteristic or parameter of a virtual entity or image can be controlled or modified using this invention. A further example is illustrated in FIGS. 18 and 19. In FIG. 18, a virtual entity, i.e., a person 180, is illustrated wearing a set of clothing 182. FIG. 19 shows the results of placing an object 184 that is configured in accord with the present invention, so that it covers person 180. In response to detecting object 184 in this position, a software program that is responsible for displaying the person illustrates person 180 wearing a different set of clothing 182'. Similarly, although not illustrated, object 184 can be manipulated, for example, by rotating the object as indicated by an arrow 188, to change to different sets of clothing, or to modify other characteristics or features of person 180. Thus, rotation of object 184 might be employed to change a hairstyle 186 of the person, or to change the color of the hair, or other characteristics of the person. Similar functionality can be applied to almost any type of virtual entity.

Logical Steps for Implementing the Present Invention

A flowchart 200 in FIG. 20 illustrates the logical steps that are implemented in responding to an object placed on the interactive display surface, as discussed above. Following the start of the logic, a step 202 provides for detecting IR light that is received from one or more objects configured in accord with the present invention that have been placed on the interactive display surface. In one of the exemplary applications of the present invention that were discussed above, a plurality of such objects serve much like the pieces of a jigsaw puzzle, while in other of the embodiments, only a single such object is employed to implement a specific function when detected by a software program used to display a virtual entity or image on the interactive display surface. However, it will be understood the more than one such object can be placed on the interactive display surface for carrying out a plurality of different functions, and each such object can be used for a different function. In a step 204, the logic provides for identifying each of the objects that have been placed on the interactive display surface, by decoding an encoded pattern of IR light that is received from an encoded marking on each such object. The interactive display surface determines a position and orientation of each such object in response to the IR light received from the object, as indicated in a step 206. Based on the software program that is being executed to display a virtual entity or image or a plurality of such virtual entities or images on the interactive display surface, an appropriate modified virtual entity or image is displayed on the interactive display surface so that it can be viewed with visible light that passes through each object, as noted in a step 208.

The details that determine the nature of the image, virtual entity, or other modification of what was previously displayed before the object was detected on interactive service clearly depend upon the software program that is responsible will performing this function. As will be evident from the preceding discussion, the range of applications in which the present invention is useful is almost unlimited. Accordingly, it is not possible to provide details in the flowchart about each of these applications, and they are not particularly relevant to the present invention other than by way of illustration, as provided by the examples discussed above. One of ordinary skill in the art will clearly understand how to employ a specific software program to provide a virtual entity or image that is visible through an object that is configured in accord with the present invention, in response to a predefined function that is associated with the object detected on the interactive display surface.

Next, a decision step 210 determines if the position, or orientation of any object detected on the interactive display surface has changed over time. If so, a step 212 adjusts the virtual entity or image that is displayed on the interactive display surface with visible light passing through the object, in a manner determined by the software program that responds to the detection of the object. Otherwise, a negative result from decision step 210 leads back to step 202, to update the detection of IR light reflected from any objects on the interactive display surface. Similarly, after step 212, the logic again loops back to step 202, to update the detection of such objects.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A system that includes objects that are generally optically transparent to visible light through which portions of an image are transmitted using visible light, so that as the objects are moved about, the portions of the image move with the objects, comprising:
   (a) a source of non-visible light for illuminating the objects;
   (b) an image source that produces images using visible light;
   (c) a sensor for producing a signal in response to non-visible light that is received from the objects;
   (d) a memory in which machine instructions are stored;
   (e) a processor coupled to the image source, the sensor, and the memory, said processor executing the machine instructions to carry out a plurality of functions, including:
      (i) responding with the sensor to a distinctive marking applied to each of the objects in the signal produced by the sensor, the marking comprising a material that substantially transmits visible light, but which affects light in a non-visible waveband from the non-visible light source, by one of:
         (A) reflecting the light in the non-visible waveband; and
         (B) absorbing the light in the non-visible waveband;
      (ii) identifying and detecting a location and an orientation of each object, in response to the signal produced by the sensor that receives light in the non-visible waveband from the objects; and
      (iii) causing the image source to transmit the portions of the image through the objects as visible light, so that each portion of the image is associated with the object through which the portion of the image is visible, so that when the objects are assembled in a correct layout, the image is clearly apparent by collectively viewing the portions of the image visible through the objects that are thus assembled, said objects representing the image in a manner similar to pieces of a jigsaw puzzle that are correctly assembled to display a picture.

2. The system of claim 1, wherein the machine instructions further cause the processor to execute software that enables the image to be selectively changed, so that portions of a different image produced by the image source are apparent through the objects.

3. The system of claim 1, wherein the machine instructions further cause the processor to initially randomly distribute the portions of the image among the objects, so that the image then not readily apparent from viewing the portions of the image.

4. The system of claim 1, wherein the machine instructions further cause the processor to detect one of two different distinctive markings applied to each of the objects, including a first marking that is associated with the portion of the image, and a second marking associated with a mirror version of the portion of the image that is associated with the first marking, so that:
   (a) all of the objects have to oriented with first marking providing the non-visible light that is received by the sensor, to enable the image produced by the image source to be clearly apparent; or alternatively,
   (b) all of the objects have to be oriented with the second marking applied providing the non-visible light that is received by the sensor, to enable a mirror version of the image produced by the image source to be clearly apparent.

5. The system of claim 1, wherein the machine instructions further cause the processor to cause the image source to produce a sequence of images that are divided into portions associated with the objects and which are visible through each of the objects, so that when the objects are correctly assembled, the sequence of images is readily apparent from the visible light from the image source passing through the objects.

6. The system of claim 5, wherein the sequence of images comprises a video.

7. The system of claim 5, wherein the machine instructions further cause the processor to enable a user to employ one of:
   (a) a personal image provided by a user for the image; and
   (b) a sequence of personal images provided by a user for the sequence of images.

8. An object for providing input to carry out a predefined function, comprising an encoded marking applied to at least one surface of a material that is optically transparent to visible light comprising the object, the encoded marking serving to identify the object, its position on a display surface that is coupled to a computing system, and an orientation of the object on the display surface, the encoded marking comprising a material that substantially transmits visible light without affecting the visible light, but which modifies a non-visible light so that the object is readily identified in response to the modification of the non-visible light, identification of the object providing an input to a computing system that causes a function associated with the object to be implemented by the computing system that affects a virtual entity or image formed with visible light that passes through the object.

9. The object of claim 8, wherein a different encoded marking is applied to a different surface of the object, said different encoded marking serving to provide a different input to the computing system and causing a different predefined function associated with the object to be implemented by the computing system.

10. The object of claim 8, wherein a manipulation of the object modifies a parameter related to the function associated with the object and affects the virtual entity or image that is formed with the visible light that passes through the object.

11. A method for enabling an object having at least a substantial central part that is generally optically transparent to visible light, to be optically recognized in response to non-visible light received from the object without substantially affecting visible light transmission through the object, comprising the steps of:
   (a) applying a first marking on a first surface of the object, said first marking comprising a material that substantially transmits visible light, but which affects light in a non-visible waveband by one of:
       (i) reflecting the light in the non-visible waveband; and
       (ii) absorbing the light in the non-visible waveband;
   (b) directing light in the non-visible waveband onto the first surface of the object where the first marking is applied; and
   (c) detecting an image of at least a portion of the object, in response to light in the non-visible waveband that is received from the object, the image enabling the object to be recognized.

12. The method of claim 11, further comprising the step of applying a second marking to a second surface of the object, said second marking comprising substantially the same material as the first marking, said first surface being separated from the second surface by:
   (a) a reflective material that substantially transmits visible light, but reflects light in the non-visible waveband, if the material comprising the first marking and the second marking absorbs the light in the non-visible waveband; or
   (b) an absorptive material that substantially transmits visible light, but absorbs light in the non-visible waveband, if the material comprising the first marking and the second marking reflects the light in the non-visible waveband.

13. The method of claim 12, further comprising the step of determining a state of the object by detecting light in the non-visible waveband from one of the first marking and the second marking, the first marking and the second marking each indicating a different state of the object.

14. The method of claim 13, further comprising the step of using the state of the object that was determined to control a software application that produces visible light, which passes through the object.

15. The method of claim 12, further comprising the steps of:
   (a) determining a change in an orientation of the object over time based upon the image produced with the light in the non-visible waveband from one of the first surface and the second surface; and
   (b) as a function of the change in the orientation of the object over time, controlling a software application that produces visible light that passes through the object.

16. The method of claim 15, wherein the change in the orientation of the object based upon the non-visible light from the first marking causes a different control function to be applied to the software application than the change in the orientation of the object based upon the non-visible light from the second marking.

17. The method of claim 12, wherein the second marking is applied as an encoded pattern that is automatically recognized in the image of at least the portion of the object when the light in the non-visible waveband is received from the second surface.

18. The method of claim 11, wherein the first marking is applied as an encoded pattern that is automatically recognized in the image of at least the portion of the object when the light in the non-visible waveband is received from the first surface.

19. The method of claim 11, further comprising the steps of:
   (a) determining an orientation of the object based upon the light in the non-visible waveband that is received from the first surface; and
   (b) detecting a change in the orientation of the object over time, for providing an input to control a software application that produces visible light passing through the object.

20. The method of claim 19, wherein the change in the orientation of the object over time appears to change a magnification factor affecting an image formed by the software application with the visible light, so that the image is either enlarged or decreased in relative size, as the orientation of the object is changed, depending upon a direction in which the orientation of the object is changed.

21. The method of claim 19, further comprising the step of changing an orientation of an image formed by the visible light that passes through the object by the software application, in a manner corresponding with a change in the orientation of the object over time, so that the image formed with the visible light appears to move with the object when the orientation of the object is changed.

22. The method of claim 21, further comprising the step of changing a position of an image formed by the visible light that passes through the object by the software application, in a manner corresponding with a change in the position of the object, so that the image formed with the visible light appears to move with the object when a position of the object is changed.

23. The method of claim 22, further comprising, for each of a plurality of objects like the object, repeating the steps of
   (a) applying the first marking on the first surface of each corresponding object;
   (b) directing light in the non-visible waveband onto the first surface of each corresponding object where the first marking is applied; and
   (c) detecting the image of at least the portion of each corresponding object, in response to light in the non-visible waveband that is received from each corresponding object, the image enabling each corresponding object to be recognized, and wherein the image formed with the visible light that passes through each of the plurality of objects by the software application comprises a portion of a larger image that is divided into a plurality of portions, further comprising the step of causing each of a plurality of portions of the larger image to be visible through a corresponding object so that the portions of the image appear as pieces of a jigsaw puzzle, which if properly assembled adjacent to each other, correctly present the larger image.

24. The method of claim 11, wherein a software program causes visible light passing through the object to form text corresponding to a translation of at least one word into a different language than the at least one word over which the object is positioned.

25. The method of claim 11, further comprising the steps of:
 (a) displaying a first image with visible light produced in accord with a software program; and
 (b) enabling the object to be placed over the first image; and
 (c) transmitting visible light through the object to form a second image that is related to the first image, but is different than the first image.

26. The method of claim 25, further comprising the step of stacking a plurality of objects like the object, each of plurality of objects being associated with providing a different function related to modifying the first image, so that a composite of the functions provided by each of the plurality of objects is evident in the second image.

27. The method of claim 25, wherein the first image comprises a photograph, and wherein the second image comprises the photograph in which a modification has been applied, further comprising the step of enabling a user to change an orientation of the object to adjust the modification applied to the photograph visible through the object as the second image.

28. The method of claim 25, wherein the first image represents an entity having a first appearance, and wherein the second image represents the entity having a different appearance, because some feature of the entity in the first image is modified in the second image.

29. The method of claim 28, wherein the second image represents one of a different depth, a different layer, and a subsystem of the entity.

30. The method of claim 28, further comprising the step of enabling a user to move the object to control the modification of the feature.

31. A memory medium having machine executable instructions for carrying out the steps of claim 11.

32. A method for employing objects that are generally optically transparent to visible light and through which portions of an image are transmitted using visible light, so that as the objects are moved about, the portions of the image move with the objects, comprising the steps of:
 (a) applying a distinctive marking to each of the objects, the marking comprising a material that substantially transmits visible light, but which affects light in a non-visible waveband by one of:
  (i) reflecting the light in the non-visible waveband; and
  (ii) absorbing the light in the non-visible waveband;
 (b) directing light in the non-visible waveband onto the objects where the marking is applied;
 (c) identifying and detecting a location and an orientation of each object, in response to light in the non-visible waveband that is received from the objects;
 (d) transmitting the portions of the image through the objects as visible light, so that each portion of the image is associated with the object through which the portion of the image is visible; and
 (e) enabling the objects to be assembled in a correct layout, so that the image is clearly apparent by collectively viewing the portions of the image visible through the objects that are thus assembled, said objects representing the image in a manner similar to pieces of a jigsaw puzzle that are correctly assembled to display a picture.

33. The method of claim 32, further comprising the step of enabling the image to be selectively changed using software, so that portions of a different image are apparent through the objects.

34. The method of claim 32, further comprising the step of initially randomly distributing the portions of the image among the objects, so that the image is then not readily apparent from viewing the portions of the image.

35. The method of claim 32, further comprising the step of applying different distinctive markings to an opposite surface of each of the objects from that on which the distinctive markings are applied, each different distinctive marking applied to each object being associated with a mirror portion of the corresponding to the portion of the image associated with the distinctive marking applied to the object, so that
 (a) all of the objects have to be oriented with the surface having the distinctive markings applied providing the non-visible light that is received, to enable the image to be clearly apparent; or alternatively,
 (b) all of the objects have to be oriented with the opposite surface having the different distinctive marking applied providing the non-visible light that is received, to enable a mirror version of the image to be clearly apparent.

36. The method of claim 32, further comprising the step of causing a sequence of images to be divided into portions that are visible through each of the objects, so that when the objects are correctly assembled, the sequence of images is readily apparent from the visible light passing through the objects.

37. The method of claim 36, wherein the sequence of images comprises a video.

38. The method of claim 36, further comprising the step of enabling a user to employ one of:
 (a) a personal image provided by the user for the image; and
 (b) a sequence of personal images provided by the user for the sequence of images.

39. A memory medium having machine executable instructions for carrying out the steps of claim 32.

40. A system on which an object, which is generally optically transparent to visible light, is optically recognized in response to non-visible light received from the object, without substantially effecting visible light transmission through the object, comprising:
 (a) a source of non-visible light for illuminating an object;
 (b) an image source that produces an image using visible light;
 (c) a sensor for producing a signal in response to non-visible light that is received from the object;
 (d) a memory in which machine instructions are stored;
 (e) a processor coupled to the image source, the sensor, and the memory, said processor executing the machine instructions to carry out a plurality of functions, including:
  (i) detecting light received from the object with the sensor, producing the signal, wherein the object has a first marking applied to a first surface of the object, said first marking comprising a material that substantially transmits visible light, but which affects non-visible light from the source of non-visible light, by one of:
   (A) reflecting the light in the non-visible waveband; and
   (B) absorbing the light in the non-visible waveband; and
  (ii) in response to the signal produced by the sensor, identifying the object.

41. The system of claim 40, wherein a second marking is applied to a second surface of the object, said second marking comprising substantially the same material as the first marking, said first surface being separated from the second surface by:
- (a) a reflective material that substantially transmits visible light, but reflects light in the non-visible waveband, if the material comprising the first marking and the second marking absorbs the light in the non-visible waveband; or
- (b) an absorptive material that substantially transmits visible light, but absorbs light in the non-visible waveband, if the material comprising the first marking and the second marking reflects the light in the non-visible waveband.

42. The system of claim 41, wherein the machine instructions further cause the processor to determine a state of the object by detecting light in the non-visible waveband received by the sensor from one of the first marking and the second marking, the first marking and the second marking each indicating a different state of the object.

43. The system of claim 42, wherein the machine instructions further cause the processor to control a software application that is being executed and which is producing the image with the image source using the visible light that passes through the object.

44. The system of claim 41, wherein the machine instructions further cause the processor to:
- (a) determine a change in an orientation of the object over time based upon the signal produced by the sensor in response to the light in the non-visible waveband received by the sensor from one of the first surface and the second surface; and
- (b) as a function of the change in the orientation of the object over time, control a software application being executed by the processor that produces the image with the image source, using the visible light that passes through the object.

45. The system of claim 44, wherein the change in the orientation of the object based upon the non-visible light received by the sensor from the first marking causes a different control function to be applied to the software application by the processor than the change in the orientation of the object based upon the non-visible light received by the sensor from the second marking.

46. The system of claim 41, wherein the second marking is applied as an encoded pattern that is automatically recognized by the processor based upon the signal produced by the sensor in response to the light in the non-visible waveband received from the second surface.

47. The system of claim 40, wherein the first marking is applied as an encoded pattern that is automatically recognized by the processor based upon the signal produced by the sensor in response to the light in the non-visible waveband received from the first surface.

48. The system of claim 40, wherein the machine instructions further cause the processor to:
- (a) determine an orientation of the object based the signal produced by the sensor in response to the light in the non-visible waveband that is received by the sensor from the first surface; and
- (b) detect a change in the orientation of the object over time, to provide an input to control a software application that causes the image source to produce visible light that passes through the object.

49. The system of claim 48, wherein the machine instructions further cause the processor to respond to the change in the orientation of the object over time by causing the image source to apparently change a magnification factor affecting an image formed by the software application with the visible light passing through the object, so that the image is either enlarged or decreased in relative size, as the orientation of the object is changed, depending upon a direction in which the orientation of the object is changed.

50. The system of claim 48, wherein the machine instructions further cause the processor to cause the image source to change an orientation of an image formed by the visible light that passes through the object, as determined by the software application, in a manner corresponding with a change in the orientation of the object over time, so that the image formed with the visible light appears to move with the object when the orientation of the object is changed.

51. The system of claim 50, wherein the machine instructions further cause the processor to cause the image source to change a position of an image formed by the image source using the visible light that passes through the object, as determined by the software application, in a manner corresponding with a change in the position of the object, so that the image formed with the visible light appears to move with the object when a position of the object is changed.

52. The system of claim 51, wherein the machine instructions further cause the processor to repeat functions (e)(i)-(e)(ii) of claim 40, for each of a plurality of other objects, and wherein the image formed by the image source with the visible light that passes through the object, in accord with the software application, comprises a portion of a larger image that is divided into a plurality of portions, the processor further causing the image source to produce each of a plurality of portions of the larger image with visible light that passes through a corresponding other object, so that the portions of the image appear as pieces of a jigsaw puzzle, which if properly assembled adjacent to each other, correctly present the larger image.

53. The system of claim 40, wherein the machine instructions further cause the processor to cause the image source to produce text with the visible light that passes through the object corresponding to a translation of at least one word into a different language than the at least one word over which the object is positioned.

54. The system of claim 40, wherein the machine instructions further cause the processor to cause the image source to:
- (a) display a first image with visible light from the image source that is controlled by a software program executed by the processor; and
- (b) enabling the object to be placed over the first image; and
- (c) display a second image with visible light from the image source that passes through the object, the second image being related to the first image, but different than the first image.

55. The system of claim 54, wherein the first image comprises a photograph, and wherein the second image comprises the photograph in which a modification has been applied, the machine instructions further causing the processor to respond to a change in an orientation of the object indicated by the signal from the sensor, by adjusting the modification applied to the photograph that is visible through the object as the second image.

56. The system of claim 55, wherein the machine instructions further causing the processor to enable a user to move the object to control the modification of the feature.

57. The system of claim 54, wherein the first image represents an entity having a first appearance, and wherein the second image represents the entity having a different appearance, because some feature of the entity in the first image is modified in the second image.

58. The system of claim 57, wherein the second image represents one of a different depth, a different layer, and a subsystem of the entity.

* * * * *